(12) United States Patent
Twarog et al.

(10) Patent No.: US 8,614,404 B2
(45) Date of Patent: Dec. 24, 2013

(54) ARTICULATED THERMAL PROCESSING TORCH

(75) Inventors: Peter J. Twarog, West Lebanon, NH (US); Brett Andrew Hansen, Grantham, NH (US)

(73) Assignee: Hypertherm, Inc., Hanover, NH (US)

( * ) Notice: Subject to any disclaimer, the term of this patent is extended or adjusted under 35 U.S.C. 154(b) by 1491 days.

(21) Appl. No.: 12/186,974

(22) Filed: Aug. 6, 2008

(65) Prior Publication Data

US 2009/0039059 A1 Feb. 12, 2009

Related U.S. Application Data

(60) Provisional application No. 60/963,586, filed on Aug. 6, 2007.

(51) Int. Cl.
  *B23K 10/00* (2006.01)
  *H05H 1/34* (2006.01)
(52) U.S. Cl.
  USPC ............ 219/121.44; 219/121.48; 219/121.51; 219/75
(58) Field of Classification Search
  CPC ....................................................... H01H 1/34
  USPC ............. 219/121.36, 121.39, 121.45, 121.44, 219/121.5, 121.52, 74, 75
  See application file for complete search history.

(56) References Cited

U.S. PATENT DOCUMENTS

| | | | |
|---|---|---|---|
| 2,743,346 A | 4/1956 | Scholl | |
| 2,986,624 A | 5/1961 | Marta | |
| 4,145,595 A | 3/1979 | Keller et al. | |
| 4,268,740 A * | 5/1981 | Sanders | 219/137.51 |
| 4,361,747 A | 11/1982 | Torrani | |
| 4,778,155 A | 10/1988 | Suchevich et al. | |
| 4,892,990 A * | 1/1990 | Acheson | 219/76.14 |
| 4,902,871 A | 2/1990 | Sanders et al. | |
| 5,132,513 A * | 7/1992 | Ingwersen et al. | 219/137.31 |
| 5,338,917 A | 8/1994 | Stuart et al. | |
| 5,756,959 A * | 5/1998 | Freeman et al. | 219/121.49 |
| 5,841,095 A | 11/1998 | Lu et al. | |
| 5,916,465 A | 6/1999 | New et al. | |
| 6,095,801 A * | 8/2000 | Spiewak | 431/344 |

(Continued)

FOREIGN PATENT DOCUMENTS

RU  2041777  8/1995
WO  02/13583  2/2002

OTHER PUBLICATIONS

International Search Report for International Application No. PCT/US2008/072314, Date of Mailing Feb. 16, 2009, including Written Opinion of the International Search Authority (13 Pages total).

*Primary Examiner* — Mark Paschall
(74) *Attorney, Agent, or Firm* — Proskauer Rose LLP

(57) ABSTRACT

A thermal processing torch can include a torch housing having a head portion pivotally coupled relative to a body portion with a joint portion. The torch also can include a pivotal connector simultaneously pivoting about a common axis with the joint portion of the torch housing. The pivotal connector can include an electrically conductive wall conducting an electrical current between the body portion of the torch housing and the head portion of the torch housing. The pivotal connector can also include a passage provide a processing gas between the body portion of the torch housing and the head portion of the torch housing.

33 Claims, 12 Drawing Sheets

(56) References Cited

U.S. PATENT DOCUMENTS

| | | | |
|---|---|---|---|
| 6,380,508 B1 * | 4/2002 | Sorkin | 219/121.39 |
| 6,855,905 B2 | 2/2005 | Delgado et al. | |
| 7,453,050 B2 | 11/2008 | Delgado | |
| 8,134,097 B2 * | 3/2012 | Schneider | 219/121.48 |
| 2003/0052095 A1 * | 3/2003 | Sanders et al. | 219/121.39 |
| 2006/0037947 A1 | 2/2006 | Schneider | |

* cited by examiner

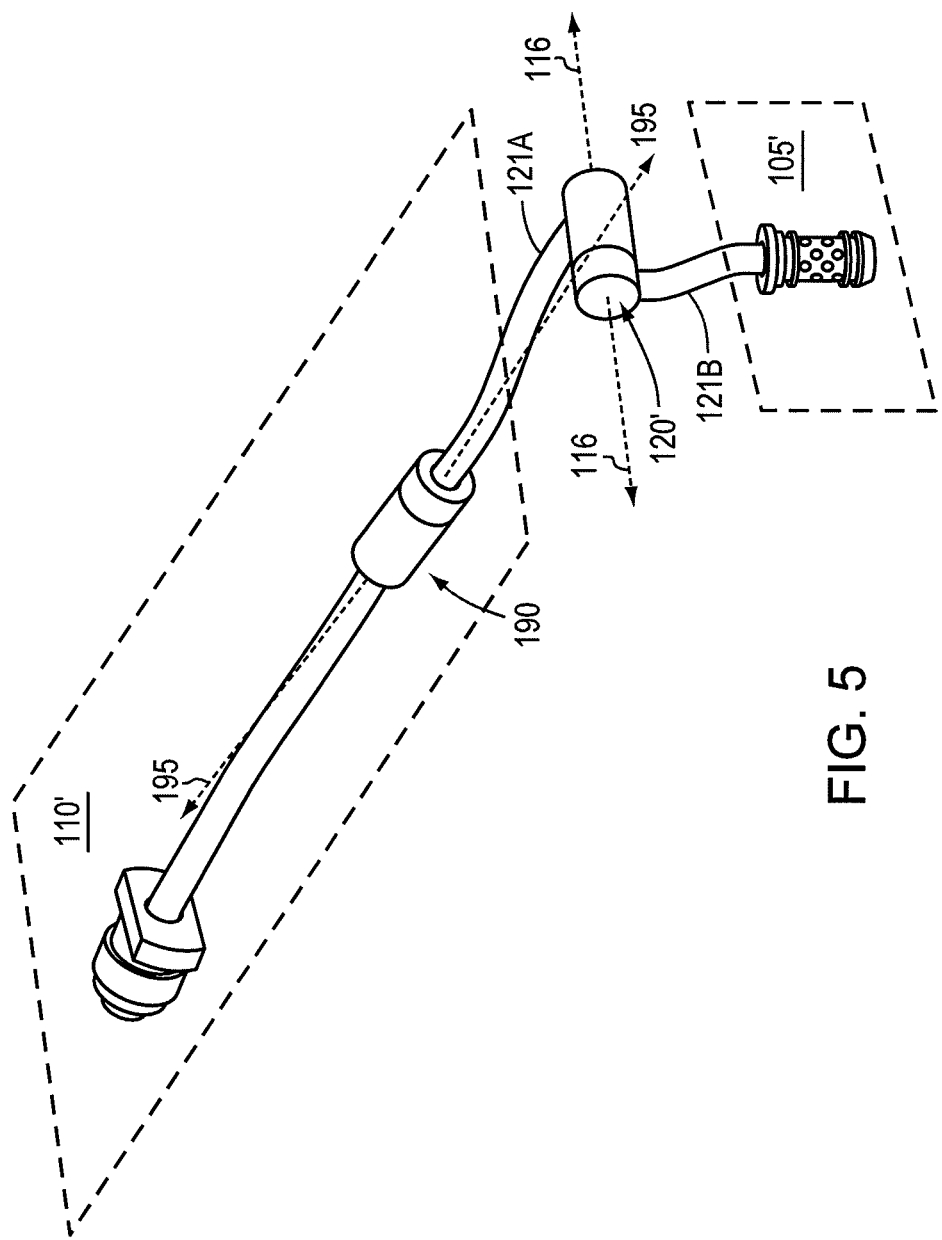

ARTICULATED THERMAL PROCESSING TORCH

CROSS-REFERENCE TO RELATED APPLICATION

This application claims the benefit of and priority to U.S. provisional patent Application No. 60/963,586 filed on Aug. 6, 2007, the disclosure of which is incorporated herein by reference in its entirety.

FIELD OF THE INVENTION

The invention relates generally to the high temperature thermal processing of materials, such as with plasma arc torches, and the cutting of materials. More specifically, the invention relates to an articulated thermal processing torch in which electrical and fluid flows are routed through a pivotal connection.

BACKGROUND OF THE INVENTION

Plasma arc torches are used in the cutting and marking of metallic materials. A plasma arc torch generally includes a torch body, an electrode mounted within the body, a nozzle with a central exit orifice, electrical connections, passages for cooling and arc control fluids, a swirl ring to control the fluid flow patterns, and a power supply. Gases used in the torch can be non-reactive (e.g., argon or nitrogen), or reactive (e.g., oxygen or air). The torch produces a plasma arc, which is a constricted ionized jet of a plasma gas with high temperature and high momentum.

Due to their versatility, plasma torches are finding uses in an increasing number of applications. Hand-held torches are now being used in ever more intricate situations, including those where access to portions of the workpiece can be difficult. Automated (mechanized) torches are being used to cut special shapes, including cuts having bevel surfaces. One way to make such cuts is to angle the torch head, such that the plasma arc emitted from the torch is not perpendicular with a planar workpiece that is being cut. Expensive and extensive automated systems have been devised to automatically rotate torches to perform bevel cuts.

Technical hurdles related to the articulated joint have thus far prevented such concepts from reaching the market. One issue preventing certain manufacturers from entering the articulated torch market has been the extensive use of torch designs with moving plungers inside the torch head. These "blowback" designs utilize flexible wires inside the torch handle, which constrain the torch design and make an articulated torch very difficult to implement into the design. See, e.g., U.S. Pat. No. 4,902,871 issued to Sanders et al. entitled "Apparatus and Process for Cooling a Plasma Arc Electrode". As mentioned above, performing a bevel cut using a mechanized plasma arc torch results in an expensive design requiring large motors to move the torch. The motors used to position the torch during the cut impose a mechanical stress on the leads of the torch, resulting in premature failure of the leads.

SUMMARY OF THE INVENTION

The invention overcomes these drawbacks in a number of ways. For example, in one aspect, the invention features a thermal processing torch that can include a torch housing having a head portion pivotally coupled relative to a body portion with a joint portion. The torch can also include a pivotal connector (e.g., an internal pivotal connector) that simultaneously pivots about a common axis with the joint portion of the torch housing. The pivotal connector can include an electrically conductive wall conducting an electrical current between the body portion of the torch housing and the head portion of the torch housing. The pivotal connector can also include a passage that can provide a processing gas between the body portion of the torch housing and the head portion of the torch housing.

In another aspect, the invention features a pivotal connector assembly for providing an electrical current and a gas flow between a head portion and a body portion of a torch. The pivotal connector assembly can include a male connector and a mating female connector. The male connector can include a tubular portion that defines a first gas passage and an electrically conductive external wall portion. The mating female connector can include a second tubular portion that defines a second gas passage and includes a second electrically conductive external wall portion. The second gas passage can be in fluid communication with the gas passage of the male connector. The connector assembly can also include a gas seal disposed between the male and female connectors providing gas isolation between the first and second gas passages and a circumscribing radial spring element disposed within the female connector and between the first and second electrically conductive external wall portion. The circumscribing radial spring element can pass an electrical current of the torch.

In yet another aspect, the invention features a torch including a head portion pivotally attached to a body portion. The torch can include a torch housing that includes a pivotal joint. The torch can include a connector disposed in a spatial relationship with the pivotal joint. The connector can conduct an electrical current and provide a processing gas between the body portion and the head portion of the torch. The connector can be disposed in the torch housing and include a first electrically conductive gas tube and a second, mating electrically conductive gas tube rotationally disposed relative to the first electrically conductive gas tube. The connector can include a resilient electrical connector electrically coupling the first electrically conductive gas tube to the second electrically conductive gas tube.

In another aspect, the invention features an articulating thermal processing torch that can include a body portion, a head portion and a pivotal joint providing fluid and electrical communication between the head portion and the body portion. The pivotal joint can enable the head portion to pivot relative to the body portion. The torch can include a rotational joint providing fluid and electrical communication through the body portion. The rotational joint can be configured to rotate the head portion and the pivotal joint about an axis of the body portion.

In yet another aspect, the invention features a method for creating a bevel cut with a torch. The method can include pivoting a head portion of the torch relative to a torch body. The torch body can be rigidly affixed to a gantry. The method can also include rotating the pivoted head portion about a longitudinal axis of the torch body to position the torch head relative to a workpiece.

In another aspect, the invention features an articulating thermal processing torch. The torch can include a torch body, a head portion and a motorized pivot joint mechanically coupled to at least one of the torch body or head portion to enable the head portion to pivot relative to the body. The torch can also include a motorized rotational joint mechanically coupled to at least one of the torch body or head portion to enable the head portion to rotate relative to at least a portion of the body for positioning the torch head relative to a workpiece.

In yet another aspect, the invention features a beveling torch system that can include a torch body having a central longitudinal axis, a torch head connected to the body, at least one gas lead extending into the torch head and at least one electrical lead extending into the torch head. The system can also include a rotatable connector rotating the torch head independently of the at least one gas lead and the at least one electrical lead about the central longitudinal axis of the torch body. The system can include a pivotal connector pivoting the torch head about a second axis, the second axis disposed at an angle relative to the central longitudinal axis of the torch body. The pivotal connector can include an electrically conductive wall conducting an electrical current and a passage providing a processing gas.

In other examples, any of the aspects above, or any apparatus or method described herein, can include one or more of the following features.

In some embodiments, a pivotal connector includes an electrically conductive male connector that includes a substantially cylindrical body and an electrically conductive female connector that includes a second substantially cylindrical body adapted to mate with the electrically conductive male connector. The pivotal connector can include a Louvertac electrical connector disposed between the substantially cylindrical body of the male connector and the second substantially cylindrical body of the female connector.

In some embodiments, the electrically conductive wall of the connector (e.g., internal connector or pivotal connector) defines the passage that provides the processing gas between the body portion of the torch housing and the head portion of the torch housing.

In some embodiments, a torch can include a second pivotal connector (e.g., second internal pivotal connector) disposed relative to a pivotal connector (e.g., a first pivotal connector). The second pivotal connector can include a second electrically conductive wall conducting a second electrical current between the body portion of the torch housing and the head portion of the torch housing. The second pivotal connector can include a second passage that provides a second processing gas between the body portion of the torch housing and the head portion of the torch housing. In some embodiments, the second electrically conductive wall defines the second passage providing a second processing gas.

In some embodiments, a pivotal connector can conduct a pilot current or a cutting current. A second pivotal connector can conduct a pilot current or a cutting current. In some embodiments, a torch can include a pilot wire extending through the joint portion. The pilot wire can pass a pilot current from the body portion of the torch housing to the head portion of the torch housing. A torch can also include cap sensor switch wires extending through the joint portion.

A pivotal connector can include an elbow joint directing the processing gas in a perpendicular direction from the common axis (e.g., a common axis of an pivotal connector and a joint portion of the torch housing).

A torch can also include a rotational joint of the torch housing and a rotatable connector configured to rotate the head portion of the torch housing, joint portion of the torch housing and the pivotal connector relative to the body portion of the torch housing.

In some embodiments, a gas seal can include an o-ring. A gas seal can also include complementary sealing, manufactured, or formed surfaces.

In some embodiments, a connector conducting an electrical current and providing a processing gas between the body portion and the head portion of the torch can be independent from and disposed relative to a pivotal joint.

A first electrically conductive gas tube can be an electrically conductive male connector. In some embodiments, a second electrically conductive gas tube can be an electrically conductive female connector. In some embodiments, the resilient electrical connector is a Louvertac electrical connector disposed between the first electrically conductive gas tube and the second electrically conductive gas tube.

A torch can also include a second connector independent to and disposed relative to the pivotal joint of the torch housing. The second connector can conduct a second electrical current and can provide a second processing gas between the body portion and the head portion of the torch. In some embodiments, the electrical current or the second electrical current is a pilot current or a cutting current.

In some embodiments, a torch includes a pilot wire passing a pilot current between the body portion and the head portion. The torch can also include cap sensor switch wires extending between the body portion and the head portion.

In some embodiments, the connector includes an elbow joint directing the processing gas in a perpendicular direction from a longitudinal axis of the body portion of the torch. A torch can also include a rotational joint of the torch housing and a rotatable connector configured to rotate the head portion and the connector relative to the body portion of the torch.

In some embodiments, an articulating thermal processing torch includes a pivotal joint and a rotational joint, where the rotational joint is separate and independent to the pivotal joint. A pivotal joint can be configured to pivot the head portion relative to the body portion up to about 180 degrees. In some embodiments, the rotational joint is configured to rotate the head portion and the pivotal joint relative to at least a portion of the body portion up to about 360 degrees.

In some embodiments, a pivotal joint includes a pivotal connector. The pivotal connector can simultaneously pivot about a common axis with the pivotal joint of the torch. The pivotal connector can include an electrically conductive wall conducting an electrical current between the body portion and the head portion and a passage provides a processing gas between the body portion and the head portion of the torch. In some embodiments, the electrically conductive wall defines the passage providing the processing gas.

In some embodiments, a pivotal connector pivots a torch head about a second axis substantially perpendicular to a central longitudinal axis of a torch body. A torch head can be configured to continuously rotate (e.g., rotate without stopping) independently of at least one gas lead and at least one electrical lead about a central longitudinal axis of the torch body. In some embodiments, the torch head is mounted on a torch sleeve, the torch sleeve configured to rotate about the central longitudinal axis and pivot the torch head about a second axis substantially perpendicular to the central longitudinal axis. In some embodiments, at least one electrical motor (e.g., which can include actuators and gears) pivots and rotates the torch head.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 5 shows a pivotal connector and rotatable connector for a thermal processing torch, according to yet another illustrative embodiment of the invention.

DETAILED DESCRIPTION OF THE INVENTION

Figure 1:
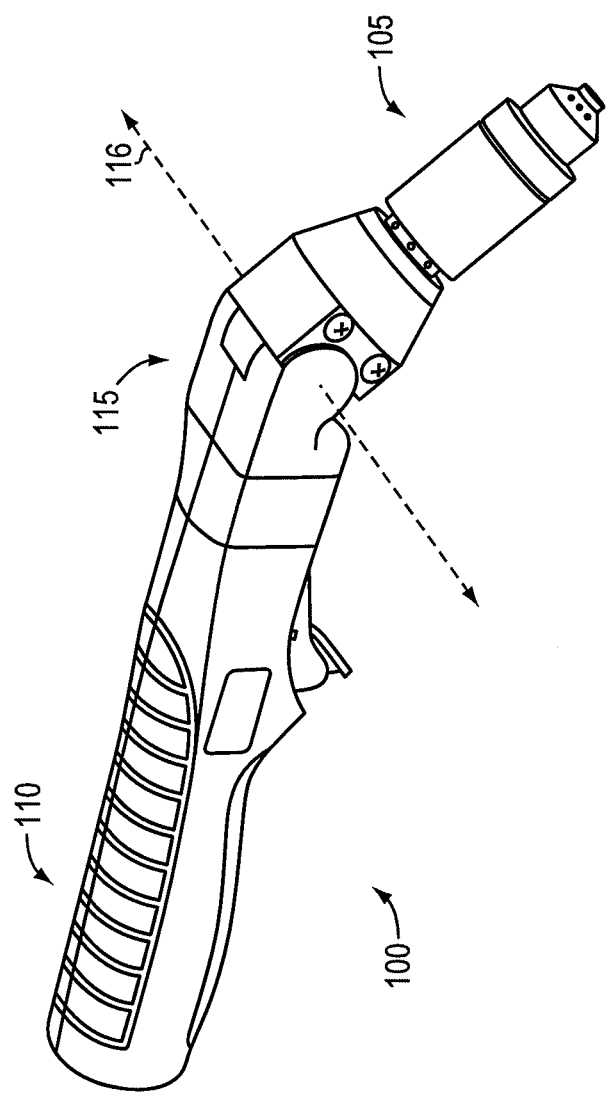
FIG. 1 shows a perspective view of a thermal processing torch, according to an illustrative embodiment of the invention.

FIG. 1 shows a perspective view of an articulating thermal processing torch 100 (e.g., welding or plasma arc torch), according to an illustrative embodiment. The thermal processing torch 100 can include a torch housing (e.g., external torch housing) having a head portion 105 pivotally coupled or pivotally attached relative to a body portion 110 with a joint portion 115. The torch 100 can also include a pivotal connector (not shown) that simultaneously pivots about a common axis 116 with the joint portion 115 of the external torch housing.

In some embodiments, a torch 100 includes a pilot wire passing a pilot current between the body portion 110 and the head portion 105. The torch 100 can also include cap sensor switch wires extending between the body portion 110 and the head portion 105. At least one pilot wire, cap sensor wire, or any combination thereof, can extend through the joint portion 115 of the torch 100.

Figure 2A:
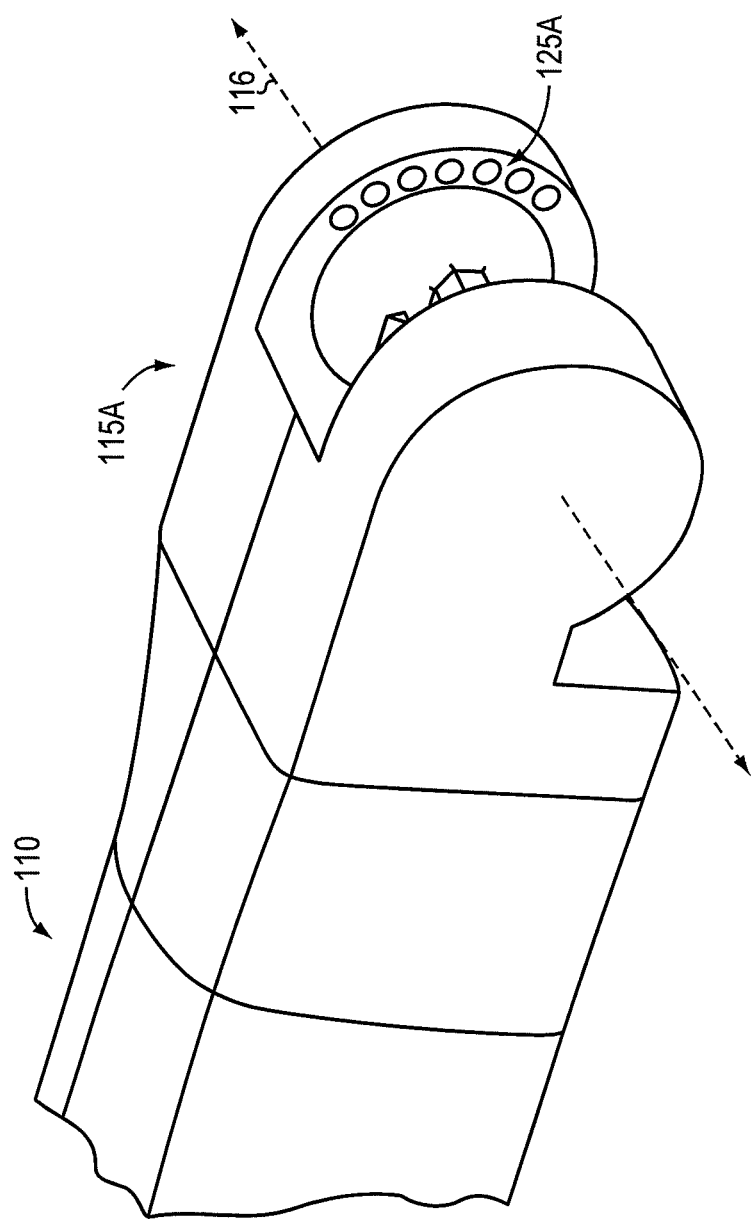
FIG. 2A shows a partial perspective view of a joint of a housing for a thermal processing torch, according to an illustrative embodiment of the invention.
Figure 2B:
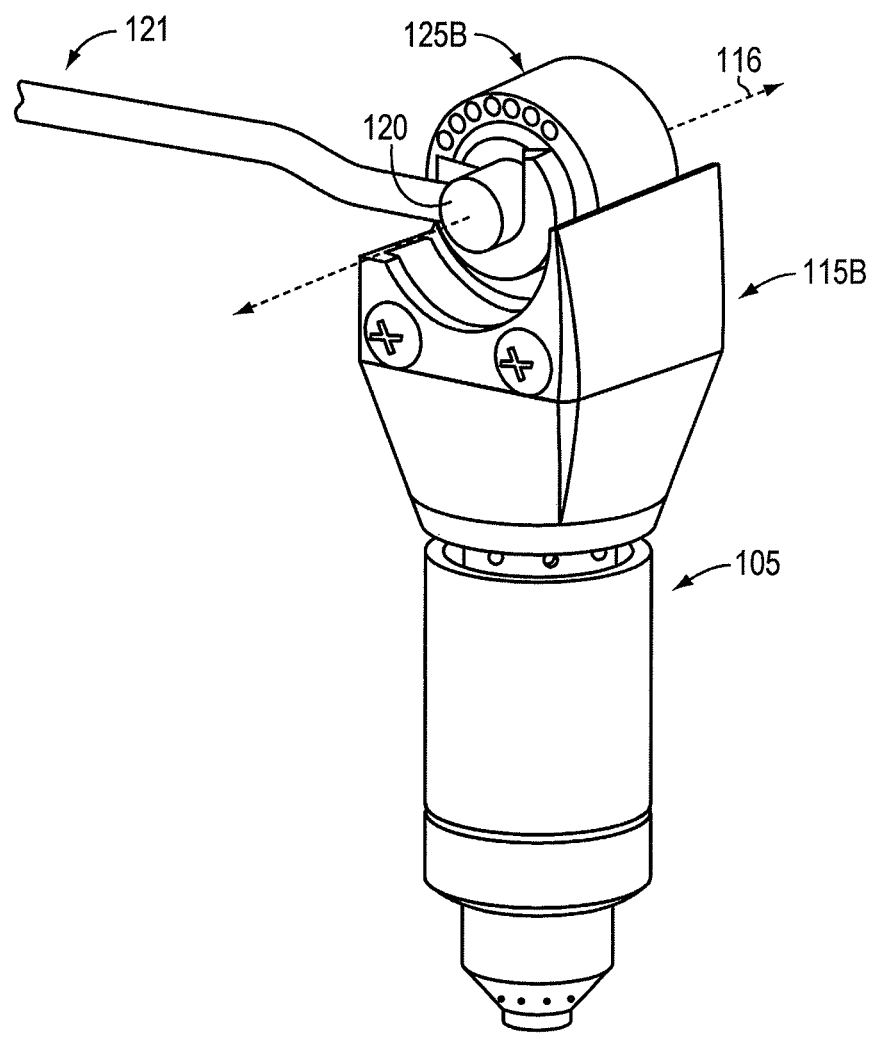
FIG. 2B shows an alternative partial perspective view of a joint of a housing for a thermal processing torch, according to an illustrative embodiment of the invention.

FIG. 2A shows a mating portion 115A of the joint portion 115 of an external torch housing for a thermal processing torch (e.g., the thermal processing torch 100). FIG. 2B shows a corresponding mating portion 115B and an internal pivotal connector 120 (e.g., pivotal connector). The mating portions 115A and 115B can include features 125A and 125B that allow the head portion 105 of the external torch housing to pivot relative to the body portion 110 of the external torch housing. In some embodiments, features 125A and 125B allow mating portions 115A and 115B to rotate with respect to one another about a common axis 116, thereby permitting the torch head portion 105 to pivot relative to the body portion 110 of the torch. In some embodiments, the joint portion 115 can be configured to pivot the head portion 105 up to about 180 degrees.

The joint portion 115 can be configured (e.g., molded, manufactured, etc.) to house the internal pivotal connector 120. The body portion 110, joint portion 115 and head portion 105 of the external torch housing can be configured (e.g., molded, manufactured, etc.) to house the internal pivotal connector 120. The external torch housing can be configured (e.g., molded, manufactured, etc.) to house an internal gas conduit 121 (e.g., tubes) in fluid communication with the internal connector 120 or wires (not shown) that can carry an electrical current between the body and the head of the torch 100. In some embodiments, the joint portion 115 has a detent to set the head portion of the external torch housing at a predetermined position.

Figure 3:
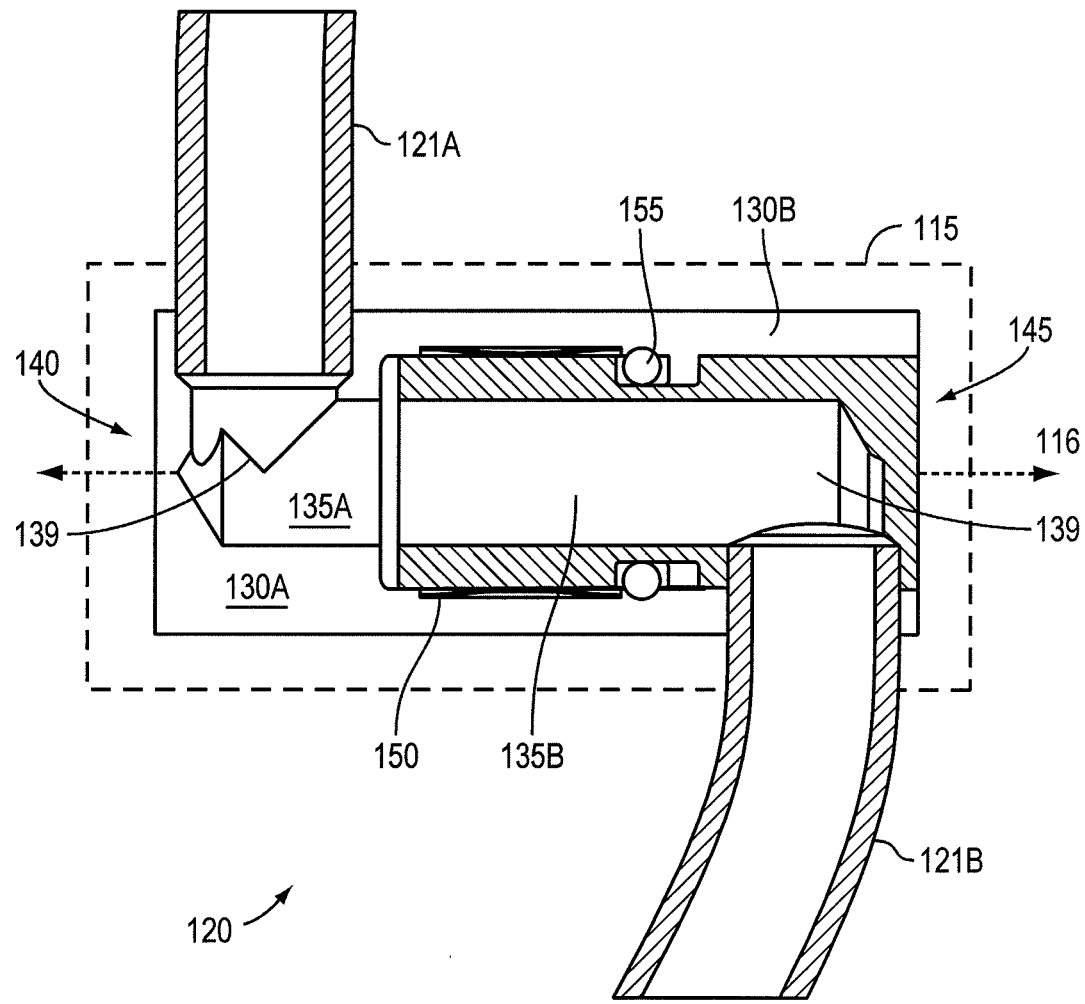
FIG. 3 shows a cut-away view of a pivotal connector for a thermal processing torch, according to an illustrative embodiment of the invention.

A thermal processing torch can include a torch housing that includes a pivotal joint. The torch can include an internal connector 120 (e.g., connector) independent of and disposed relative to a joint portion 115 (e.g., pivotal joint or joint) of the torch housing. The connector 120 can be disposed in a spatial relationship with the joint portion 115 (e.g., pivotal joint). FIG. 3 shows an internal pivotal connector 120 (e.g., pivotal connector), according to an illustrative embodiment. The internal connector 120 (e.g., internal pivotal connector 120) can conduct an electrical current and provide a processing gas, e.g., between the body portion and the head portion of the torch, while simultaneously allowing rotation about axis 116. The internal connector 120 can include an electrically conductive wall (e.g., defined by elements 130A and 130B), defining a passage (e.g., defined by elements 135A and 135B) for a processing gas or liquid. The electrically conductive wall (e.g., defined by elements 130A and 130B) can conduct an electrical current between the body portion (e.g., 110 of FIG. 1) of the external torch housing and the head portion (e.g., 105 of FIG. 1) of the external torch housing. The passage (e.g., defined by elements 135A and 135B) can provide a fluid (e.g., processing gas, liquid, etc.) between the body portion (e.g., 110 of FIG. 1) of the external torch housing and the head portion (e.g., 105 of FIG. 1) of the external torch housing. In this embodiment, a gas conduit 121 (e.g., tube) is in fluid communication with the passage 135A and 135B of the internal pivotal connector 120. The internal connector 120 can include an elbow joint 139 directing a processing gas or liquid in a perpendicular direction from the common axis 116 (e.g., a common axis 116 of an internal pivotal connector 120 and a joint portion 115 of the external torch housing). The elbow joint 139 can also direct the processing gas or liquid in a perpendicular direction from a longitudinal axis of the body portion or head portion of the torch.

In some embodiments, the electrically conductive wall that defines a passage for a processing gas or liquid for a thermal processing torch is formed by a first electrically conductive gas tube 140 engaged with a mating second electrically conductive gas tube 145. The first electrically conductive gas tube 140 can be an electrically conductive female connector. In some embodiments, a second electrically conductive gas tube 145 can be an electrically conductive male connector. The first electrically conductive gas tube 140 can include the electrically conductive wall 130A (e.g., a substantially cylindrical conductive hollow body), the internal conduit 121A (e.g., gas tube) or any combination thereof. The second, mating electrically conductive gas tube 145 can include a second electrically conductive wall 135B (e.g., a substantially cylindrical conductive hollow body) and an internal conduit 121B (e.g., gas tube) or any combination thereof. The second electrically conductive gas tube 145 can be rotationally disposed relative to the first electrically conductive gas tube 140 (e.g., about common axis 116). By configuring the first and second electrically conductive gas tubes 140 and 145 to be rotationally disposed relative to one another, the internal connector 120 can be configured to pivot a head portion of a thermal processing torch relative to a body portion of the torch. The internal connector 120 can include a resilient electrical connector 150 (e.g., Louvertac™ band available from Tyco Electronics, or a RADSOK™ connector from Amphenol (Fraser, Mich.)) electrically coupling and/or disposed between the first electrically conductive gas tube 140 to the second electrically conductive gas tube 145.

In some embodiments, a gas seal 155 can be disposed between the first electrically conductive gas tube 140 and the second electrically conductive gas tube 145. In some embodiments, instead of a first electrically conductive gas tube 140 and second electrically conductive gas tube 145, the internal pivotal connector 120 includes a first and second electrically conductive liquid tube and a seal is disposed between the first and second electrically conductive liquid tube to provide liquid isolation. In some embodiments, a seal (e.g., gas or liquid seal) can include an o-ring. As described herein, in some embodiments, a gas seal can be a liquid seal. A gas seal can also include complementary sealing, molded, manufactured, or formed surfaces, including machined or tapered surfaces.

Figure 4A:
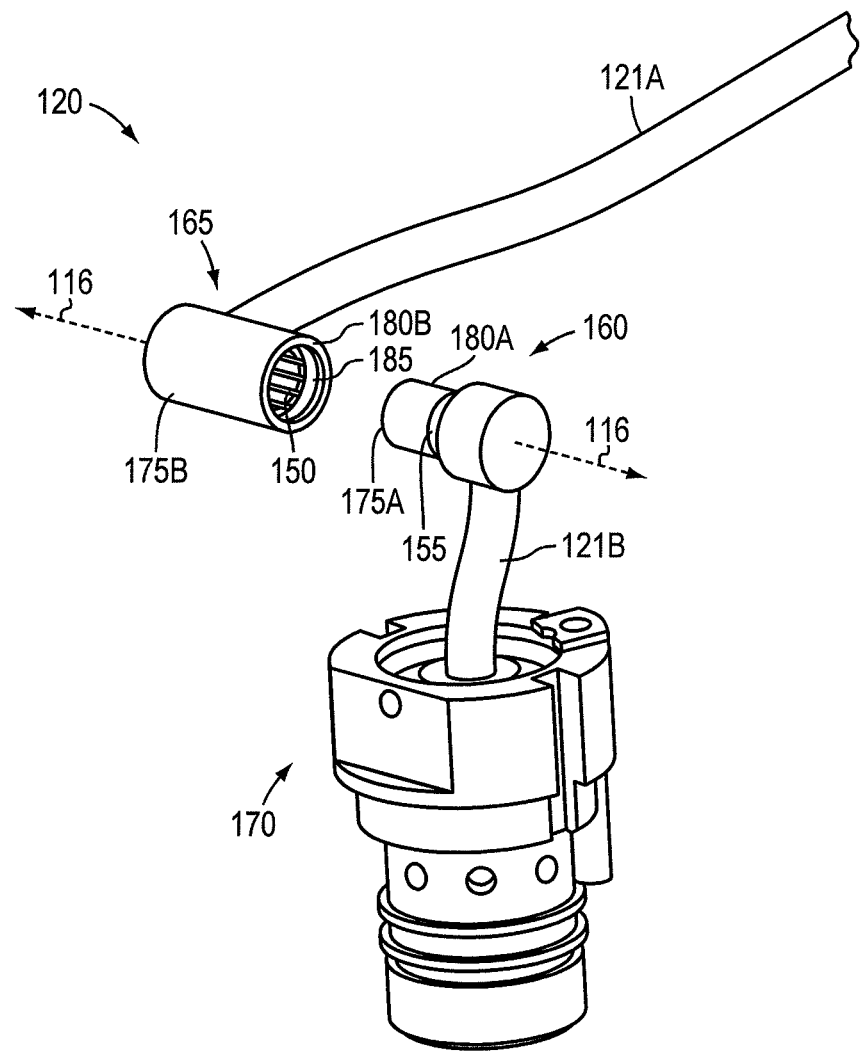
FIG. 4A shows a perspective view of a female and male connector for a thermal processing torch, according to an illustrative embodiment of the invention.
Figure 4B:
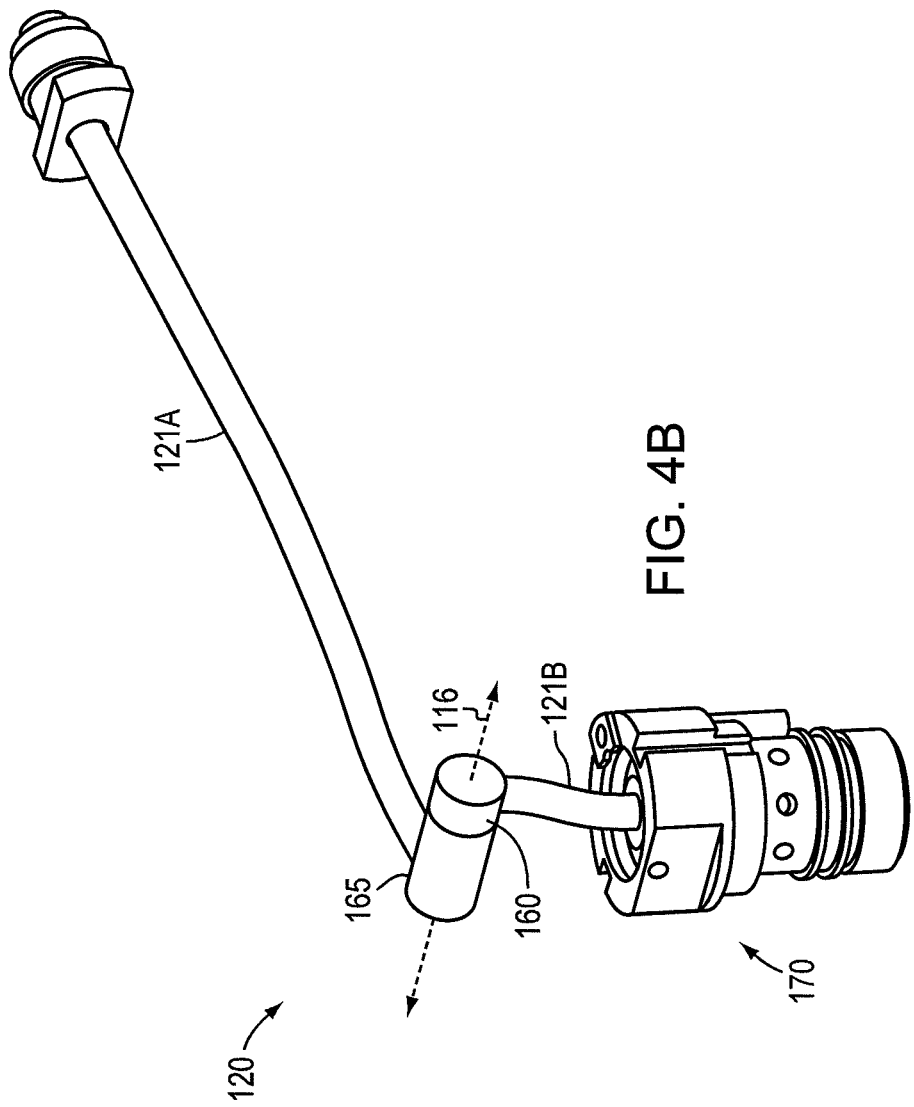
FIG. 4B shows a perspective view of the female connector of FIG. 4A engaged with the male connector of FIG. 4A.

FIGS. 4A and 4B show a perspective view of an engaged and disengaged male and female connector of a pivotal connector (e.g., internal pivotal connector) for a thermal processing torch, according to an illustrative embodiment. The pivotal connector 120 assembly can include a male connector 160 and a mating female connector 165. The internal pivotal connector 120 assembly provides an electrical current and a gas flow through the engagement of the male 160 and female connector 165. The male connector 160 can be configured to rotate relative to the female connector 165 about a common axis 116, thereby permitting the torch head portion of an external housing (e.g., including torch head 170) to pivot relative to the body portion of the torch. In this embodiment, the female connector 165 is disposed relative to a body portion of the torch and the male connector 160 is disposed relative to a torch head 170. However, in other embodiments, the female connector 165 can be disposed relative to the torch head 170 and the male connector 160 can be disposed relative to the body portion of the torch (e.g., torch body).

The male connector 160 can include a tubular portion 175A that defines, at least in part, a first passage (e.g., gas passage, or passage comprised of elements 135A and 135B of FIG. 3) (not shown) and includes an electrically conductive external wall portion 180A. The mating female connector 165 can include a second tubular portion 175B that defines, at least in part, a second passage 185 (e.g., gas passage) and includes a second electrically conductive external wall portion 180B. The second passage 185 of the female connector 165 can be in fluid communication with the passage (not shown) of the male connector 160. The connector assembly 120 can also include a seal 155 (e.g., gas or liquid seal) disposed between the male connector 160 and female connector 165 providing gas isolation between a first passage (not shown) of the male connector 160 and second passage 185. The connector assembly 120 can also include a circumscribing radial spring element 150 disposed within the female connector 165 and between the first electrically conductive external wall portion 180A and second electrically conductive external wall portion 180B. The circumscribing radial spring element 150 can pass an electrical current of the torch.

In some embodiments, the male connector 160 is an electrically conductive male connector and the tubular portion 175A includes a substantially cylindrical body. A corresponding electrically conductive female connector 165 can include a second tubular portion 175B that includes a second substantially cylindrical body adapted to mate with the substantially cylindrical body of the electrically conductive male connector 160. The internal pivotal connector 120 can include a circumscribing radial spring element 150 (e.g., Louvertac™ band or a RADSOK™ connector from Amphenol) disposed between the substantially cylindrical body of the male connector and the second substantially cylindrical body of the female connector.

In some embodiments, first passage (not shown) of the male connector 160 and second passage 185 of the female connector 165 are gas passages that carry a processing gas of the plasma arc torch. In some embodiments, first passage (not shown) of the male connector 160 and second passage 185 of the female connector 165 carry liquids and seal 155 provides liquid isolation therebetween.

FIG. 5 shows an internal pivotal connector 120' (e.g., pivotal connector) and an internal rotatable connector 190 (e.g., rotatable connector) for a thermal processing torch, according to an illustrative embodiment of the invention. The internal rotatable connector 190 can be separate and independent to the internal pivotal connector 120'. An articulating thermal processing torch can include a pivotal joint (e.g., joint portion 115 of FIG. 1) providing fluid and electrical communication between the head portion 105' and the body portion 110' of the torch. In some embodiments, a pivotal joint includes an internal pivotal connector 120'. The internal pivotal connector 120' can simultaneously pivot about a common axis with the pivotal joint of the torch. The internal pivotal connector 120' can include an electrically conductive wall defining a passage for a processing gas. In some embodiments, the electrically conductive wall conducts an electrical current between the body portion 110' and the head portion 105' and the passage provides a processing gas between the body portion 110' and the head portion 105' of the torch. The pivotal joint can enable the head portion 105' to pivot relative to the body portion 110' (e.g., enables the head portion 105' to pivot in an arc relative to the body portion 110'). A pivotal joint can be configured to pivot the head portion 105' relative to the body portion 110' up to about 180 degrees.

The torch can include a rotational joint (e.g., a rotational joint disposed relative to the external torch housing (not shown) or an internal rotatable connector 190) that can provide fluid and electrical communication through the body portion 110'. An independent rotational joint can allow the articulating head to rotate or "swing" relative to the body portion 110' (e.g., torch body). In such an embodiment, the same type of connector can be used in the internal pivotal connector (e.g., internal pivotal connector 120 or 120') except that the internal conduits (e.g., conduits 121A and 121B which can include gas tubes) connects to the joint at opposite ends and in axial alignment (e.g., along axis 195). As one skilled in the art will recognize, the ability to simultaneously pivot and rotate the head of a torch allows beveling operations to be performed, but in this embodiment, minimal movement of the torch is required. The ability to simultaneously pivot and rotate the head of a torch also can allow greater access during use and maintenance of a torch. The rotational joint can be configured to rotate the head portion 105' of an external torch housing and the pivotal joint (e.g., joint portion 115 of FIG. 1) about an axis 195 of the body portion 110' of the external torch housing. In some embodiments, the rotational joint is configured to rotate the head portion 105' and the pivotal joint relative to at least a portion of the body portion 110' up to about 360 degrees. In some embodiments, a rotational joint (e.g., a rotational joint disposed relative to the external torch housing (not shown) or an internal rotatable connector 190) includes a detent to set the head portion 105' of the external torch housing and the joint portion (not shown) of the external torch housing at a predetermined position relative to the body portion 110'.

Figure 6:
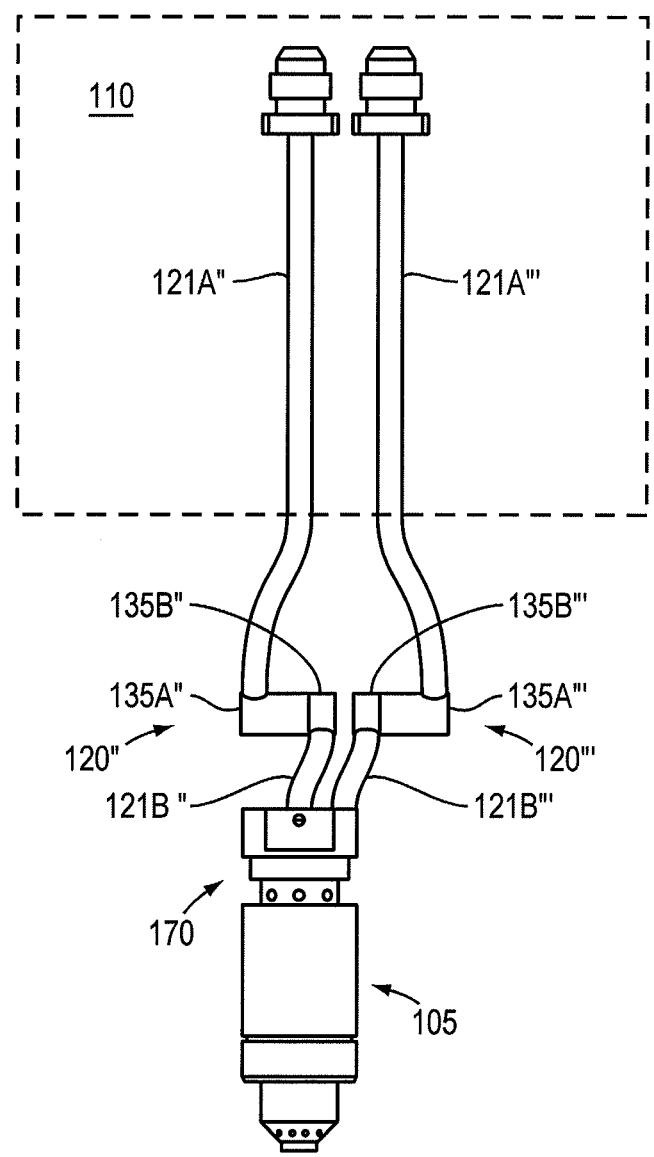
FIG. 6 shows two pivotal connectors for a thermal processing torch in series, according to yet another illustrative embodiment of the invention.

In some embodiments, a torch can include a plurality of internal pivot connectors to carry a plurality of gases and electrical currents from a body portion of a torch to a head portion of the torch. In some embodiments, a torch housing can include a plurality of passages that are adapted to carry a current and/or gas. FIG. 6 shows two internal pivotal connectors (e.g., two pivotal connectors) disposed relative to one another, according to an illustrative embodiment of the invention. In some embodiments, a torch can include an internal pivotal connector (e.g., a first internal pivotal connector) 120" disposed relative to (e.g., in parallel with) a second internal pivotal connector 120"'. Both internal pivotal connectors 120" and 120"' can be independent to and disposed relative to a joint portion (e.g., joint portion 115 of FIG. 1 or pivot joint) of the torch housing. In some embodiments, the pivotal connectors 120" and 120"' are disposed in a spatial relationship with a joint portion of the torch housing. The first and second internal pivotal connectors 120" and 120"' can conduct a first and second electrical current, respectively. The first and second internal pivotal connectors 120" and 120"' can carry a first and second processing gas or liquid, respectively.

The first internal pivotal connector 120" can be in fluid communication with an internal conduit 121A" (e.g., passage) that can carry a first gas or liquid and can be electrically conductive to carry a first electrical current. The second internal pivotal connector 120"' can be in fluid communication with an internal conduit 121A"' (e.g., passage) that can carry a second gas or liquid and can be electrically conductive to carry a second electrical current.

The first internal pivotal connector 120" can include an electrically conductive wall (e.g., formed by elements 135A" and 135B") defining a passage (not shown) for a processing gas or liquid. The electrically conductive wall (e.g., formed by elements 135A" and 135B") can conduct an electrical current between the body portion 110 of the external torch housing and the head portion 105 of the external torch housing. The passage can provide a processing gas or liquid between the body portion 110 of the external torch housing and the head portion 105 of the external torch housing. The second internal pivotal connector 120"' can include a second electrically conductive wall (e.g., formed by elements 135A"' and 135B"') defining a second passage (not shown) for a processing gas or liquid. The second electrically conductive wall (e.g., formed by elements 135A"' and 135B"') can conduct a second electrical current between the body portion 110 of the external torch housing and the head portion 105 of the external torch housing. The second passage can provide a second processing gas or liquid between the body portion 110 of the external torch housing and the head portion 105 of the external torch housing. In some embodiments, a first internal pivotal connector 120" and second internal pivotal connector 120"' can conduct at least one of a pilot current or a cutting current, at least one of a cutting gas or shield gas or any combination thereof.

Figure 7:
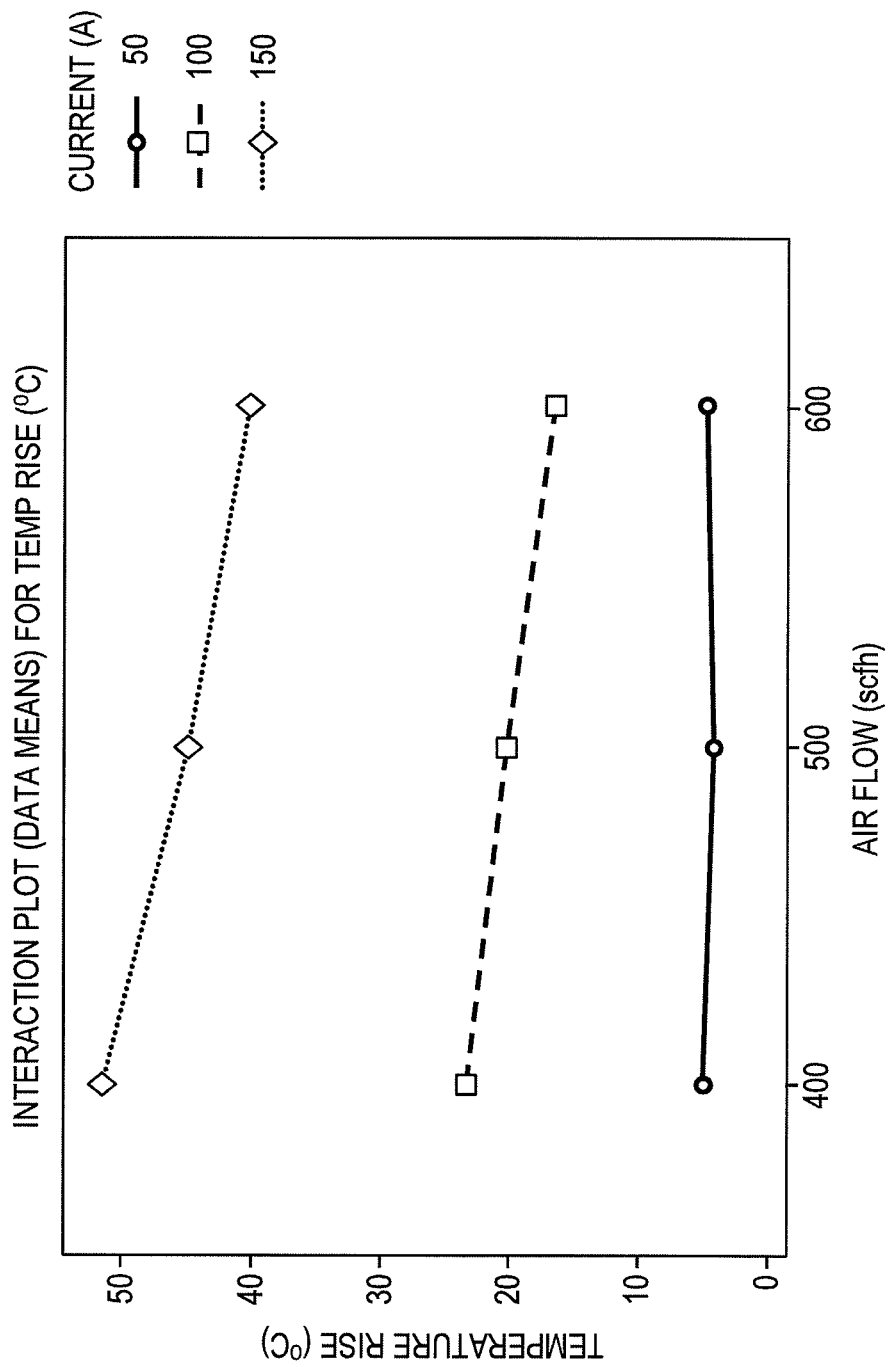
FIG. 7 shows the heat rise results for an articulating joint, according to an illustrative embodiment of the invention.

FIG. 7 shows the results of thermal heat rise tests with various electrical loads and air flow through the joint to demonstrate its viability. Specifically, the graph in FIG. 7 shows the temperature rise of a joint based on the air flow and operating current. A pivotal connector (e.g., similar to internal pivotal connector 120 and 120' described above) was used for testing. For a heat rise criteria of less than 30° C., the results of the testing show a wide operating range, particularly for operating currents of 100 Amps. The graph shows how the gas (e.g., or in some embodiments, a liquid) flowing through a connector (e.g., an internal pivotal connector or internal rotatable connector) can also act to cool the connector, particularly as the gas flow increases. An advantage of this design is that the gas can cool an inside of the electrical connector.

Figure 8:
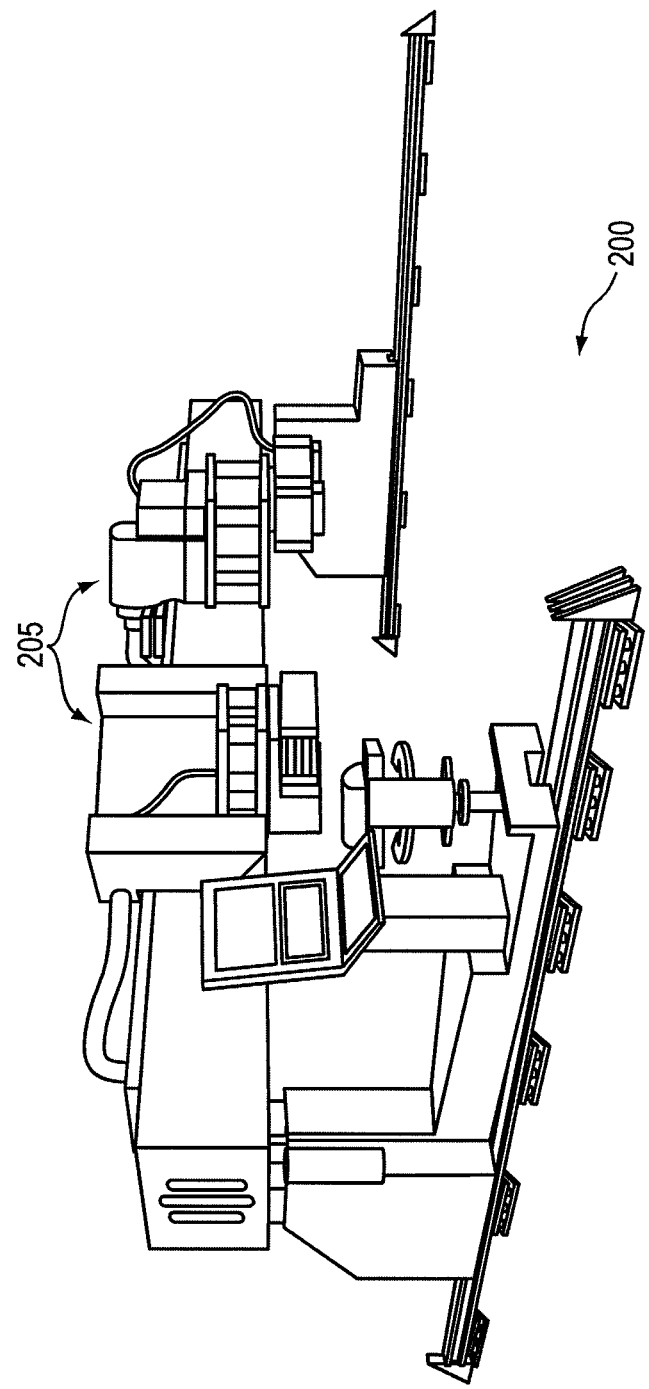
FIG. 8 shows a prior art gantry used for bevel cutting.

FIG. 8 shows an automated system 200 used with a plasma arc torch. The current state of the technology requires that when using a plasma arc torch or other similar cutting torch, large motors 205 are used to move the static torch body and head to perform the cut. Several such motors are required for each torch head as movement of the torch head about several different axes is required, often simultaneously. As a result such systems are very large, imprecise, trouble-prone, and expensive and by moving the torch body and head, can impose mechanical stress and strains on the leads extending from the torch body.

Figure 9A:
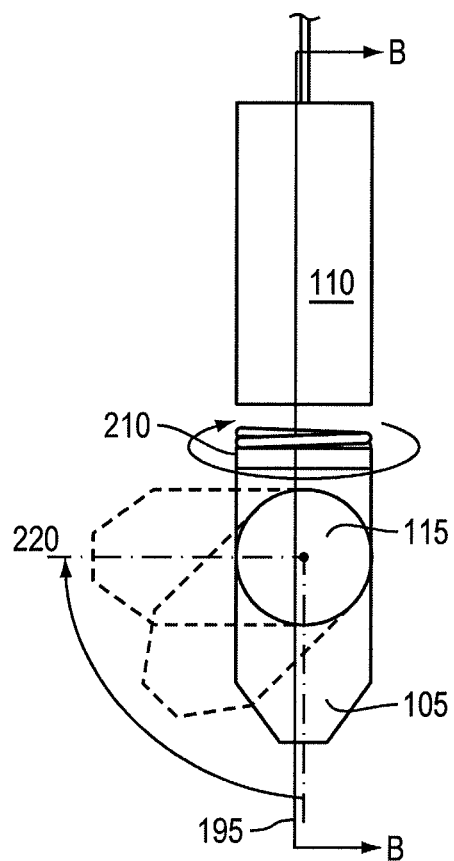
FIG. 9A shows a pivotal and rotational joint of an external housing for a mechanized bevel, according to an illustrative embodiment of the invention.
Figure 9B:
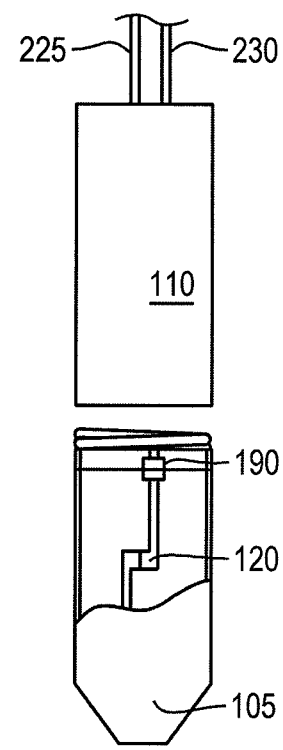
FIG. 9B shows the pivotal connector and rotational connector for the mechanized bevel of FIG. 9A.

FIGS. 9A and 9B show the pivotal and rotational capability that can be used to perform a bevel cut, according to an illustrative embodiment of the invention. A thermal processing torch, such as a plasma arc torch, can include a joint portion 115 and a rotational joint 210 disposed relative to a head portion 105 of an external housing of the torch. Joint portion 115 can include an internal pivotal connector 120 and rotational joint 210 can include internal rotatable connector 190, allowing both pivotal and rotational movement.

Figures 10A, 10B:
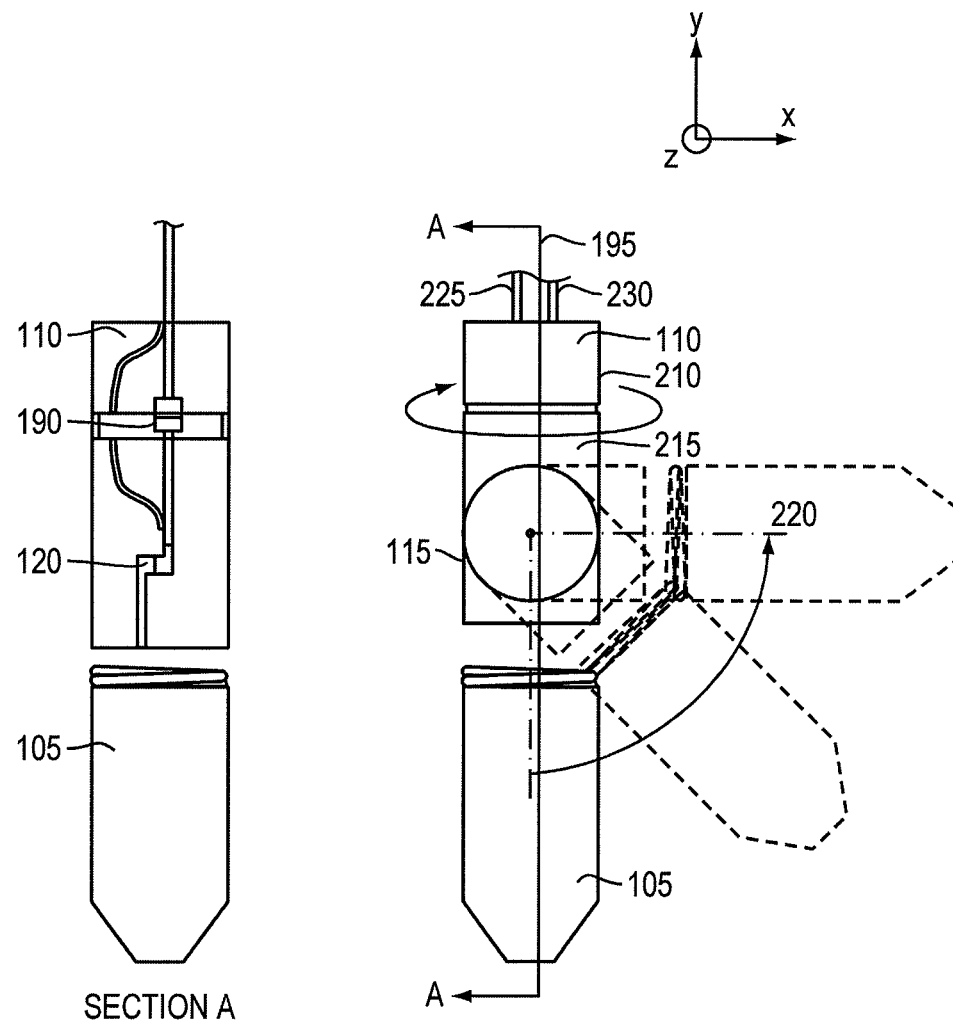
FIG. 10A shows a pivotal and rotational joint of an external housing for a mechanized bevel, according to yet another illustrative embodiment of the invention.
FIG. 10B shows the internal electrical connection for the mechanized bevel of FIG. 10B.

FIGS. 10A and 10B show the pivotal and rotational capability that can be used to perform a bevel cut, according to an alternative illustrative embodiment of the invention. In this embodiment, the joint portion 115 and rotational joint 210 are disposed relative to the torch body, permitting at least a portion of the torch body 215 and head portion 105 to be pivoted and rotated.

The ability to simultaneously pivot and rotate the head of a torch allows beveling operations to be performed, but in this embodiment, minimal movement of the torch is required and large expensive motors do not need to be used to move the entire torch. In this embodiment, the joint portion 115 and rotational joint 210 are disposed relative to the torch head 105, permitting only the head portion 105, rather than the entire torch, to be pivoted and rotated.

A method for creating a bevel cut with a torch can include pivoting a head portion 105 of the torch relative to a torch body (e.g., body portion 110). The torch body can be mounted in a stationary position on and relative to a gantry (not shown). In some embodiments, the torch body is rigidly affixed to a gantry. The method can also include rotating the pivoted head portion 105 about a longitudinal axis 195 of the torch body 110 to position the torch head (e.g., head portion 105) relative to a workpiece.

In some embodiments, the torch can have motorized rotational and/or pivotal capabilities. The torch can include a torch body (e.g., body portion 110), a head portion 105 and a motorized pivot joint (e.g., motorized joint having a pivotal capability of joint portion 115) configured to pivot the head portion 105 relative to the body (e.g., body portion 110). The motorized pivot joint can be mechanically coupled to at least one of the torch body or head portion to enable the head portion to pivot relative to the body. The torch can also include a motorized rotational joint (e.g., motorized joint having a rotational capability of rotational joint 210) configured to rotate the head portion 105 and the motorized pivot joint relative to at least a portion of the body and position the torch head relative to a workpiece. The motorized rotational joint can be mechanically coupled to at least one of the torch body or head portion to enable the head portion to rotate relative to at least a portion of the body for positioning the torch head relative to a workpiece.

In some embodiments, a beveling torch system that can include a torch body 110 having a central longitudinal axis 195 and a torch head (e.g., head portion 105) having a central longitudinal axis 220. The torch head can be connected to the torch head. Depending on the pivotal location of the torch head, the central longitudinal axis 220 of the torch head can be aligned with the longitudinal axis 195 of the body portion 110. If the torch head is pivoted at an angle, then the central longitudinal axis 220 of the head is disposed at an angle relative to the longitudinal axis 195 of the body portion 110. The beveling system can include at least one gas lead 225 extending into the torch head and at least one electrical lead 230 extending into the torch head. The system can also include a rotatable connector 190 (e.g., internal rotatable connector) rotating the torch head independently of the at least one gas lead 225 and the at least one electrical lead 230 about the central longitudinal axis 195 of the torch body. The system can include an internal pivotal connector 120 that can include an electrically conductive wall (e.g., wall comprised of 130A and 130B as described above in FIG. 3) defining a passage (e.g., passed comprised of 135A and 135B as described above in FIG. 3) for a processing gas. The electrically conductive wall can conduct an electrical current and the passage can provide a processing gas. The internal pivotal connector 120 can pivot the torch head relative to second axis (e.g., the z-axis) disposed at an angle relative to the central longitudinal axis 195 of the body of the torch. In some embodiments, the second axis is substantially perpendicular to the central longitudinal axis 195 of the torch body.

The torch head (e.g., head portion 105) can be configured to continuously rotate (e.g., rotate without stopping) independently of at least one gas lead 225 and at least one electrical lead 230 about a central longitudinal axis 195 of the torch body. In some embodiments, the torch head is mounted on a torch sleeve (e.g., for example, a sleeve that is a portion 215 of the body portion 110) disposed relative to a body portion 110, the torch sleeve configured to rotate about the central longitudinal axis 195 and pivot the torch head about a second axis (e.g., z-axis) substantially perpendicular to the central longitudinal axis 195. In some embodiments, at least one electrical motor (e.g., which can include actuators and gears) pivots and rotates the torch head.

While the invention has been particularly shown and described with reference to specific illustrative embodiments, it should be understood that various changes in form and detail may be made without departing from the spirit and scope of the invention.

What is claimed is:

1. A thermal processing torch comprising:
   a torch housing having a head portion pivotally coupled relative to a body portion with a joint portion; and
   a pivotal connector that simultaneously pivots about a common axis with the joint portion of the torch housing, the pivotal connector comprising an electrically conductive wall: i) conducting an electrical current between the body portion of the torch housing and the head portion of the torch housing; and ii) defining and surrounding at least a portion of an interior passage to provide a processing gas between the body portion of the torch housing and the head portion of the torch housing.

2. The torch of claim 1, the pivotal connector comprising:
   an electrically conductive male connector comprising a substantially cylindrical body;
   an electrically conductive female connector comprising a second substantially cylindrical body adapted to mate with the electrically conductive male connector; and
   a Louvertac electrical connector disposed between the substantially cylindrical body of the male connector and the second substantially cylindrical body of the female connector.

3. The torch of claim 1, further comprising a second pivotal connector disposed relative to the pivotal connector, the second pivotal connector comprising a second electrically conductive wall: i) conducting a second electrical current between the body portion of the torch housing and the head portion of the torch housing; and ii) defining and surrounding at least a portion of a second interior passage to provide a second processing gas between the body portion of the torch housing and the head portion of the torch housing.

4. The torch of claim 3, wherein the electrical current is a pilot current and the second electrical current is a cutting current.

5. The torch of claim 1, further comprising a pilot wire extending through the joint portion, the pilot wire passing a pilot current from the body portion of the torch housing to the head portion of the torch housing.

6. The torch of claim 1, further comprising cap sensor switch wires extending through the joint portion.

7. The torch of claim 1, wherein the pivotal connector comprises an elbow joint directing the processing gas in a perpendicular direction from the common axis.

8. The torch of claim 1, further comprising a rotational joint of the torch housing and a rotatable connector configured to rotate the head portion of the torch housing, joint portion of the torch housing and the pivotal connector relative to the body portion of the torch housing.

9. A pivotal connector assembly for providing an electrical current and a gas flow between a head portion and a body portion of a torch, the connector assembly comprising:
   a male connector comprising a tubular portion that defines a first interior gas passage and includes an electrically conductive external wall portion partially enclosing the first interior gas passage;
   a mating female connector comprising a second tubular portion that defines a second interior gas passage and includes a second electrically conductive external wall portion partially enclosing the second gas passage, the second interior gas passage in fluid communication with the first interior gas passage;
   a gas seal disposed between the male and female connectors providing gas isolation between the first and second interior gas passages to provide the gas flow to the head portion; and
   a circumscribing radial spring element disposed within the female connector and between the first and second electrically conductive external wall portion, the circumscribing radial spring element passing an electrical current of the torch.

10. The connector assembly of claim 9 wherein the gas seal comprises an o-ring.

11. The connector assembly of claim 9 wherein the gas seal comprises complementary sealing or manufactured surfaces.

12. A torch including a head portion pivotally attached to a body portion, the torch comprising:
a torch housing comprising a pivotal joint;
a connector disposed in a spatial relationship with the pivotal joint, the connector conducting an electrical current and providing a processing gas between the body portion and the head portion of the torch through a fluid passage, the connector disposed in the torch housing and comprising:
a first electrically conductive gas tube circumscribing at least a portion of the fluid passage;
a second, mating electrically conductive gas tube rotationally disposed relative to the first electrically conductive gas tube, the second, mating electrically conductive gas tube circumscribing at least a portion of the fluid passage; and
a resilient electrical connector electrically coupling the first electrically conductive gas tube to the second electrically conductive gas tube.

13. The torch of claim 12 wherein the connector is independent of and disposed relative to the pivotal joint.

14. The torch of claim 12, wherein the first electrically conductive gas tube is an electrically conductive male connector and the second electrically conductive gas tube is an electrically conductive female connector.

15. The torch of claim 12, wherein the resilient electrical connector is a Louvertac electrical connector disposed between the first electrically conductive gas tube and the second electrically conductive gas tube.

16. The torch of claim 12, further comprising a second connector independent to and disposed relative to the pivotal joint of the torch housing, the second connector configured to conduct a second electrical current and to provide a second processing gas between the body portion and the head portion of the torch.

17. The torch of claim 16, wherein the electrical current is a pilot current and the second electrical current is a cutting current.

18. The torch of claim 12, further comprising a pilot wire to pass a pilot current between the body portion and the head portion.

19. The torch of claim 12, further comprising cap sensor switch wires extending between the body portion and the head portion.

20. The torch of claim 12, wherein the connector comprises an elbow joint to direct the processing gas in a perpendicular direction from a longitudinal axis of the body portion of the torch.

21. The torch of claim 12, further comprising a rotational joint of the torch housing and a rotatable connector configured to rotate the head portion and the connector relative to the body portion.

22. An articulating thermal processing torch comprising:
a body portion;
a head portion;
a pivotal joint providing fluid communication and electrical communication between the head portion and the body portion and enabling the head portion to pivot relative to the body portion, the fluid communication being i): configured to provide a processing gas to the head portion and ii): provided by a fluid passage confined by an electrically conductive wall that provides the electrical communication; and
a rotational joint providing fluid and electrical communication through the body portion, the rotational joint configured to rotate the head portion and the pivotal joint about an axis of the body portion.

23. The torch of claim 22 wherein the rotational joint is separate and independent to the pivotal joint.

24. The torch of claim 22 wherein the pivotal joint is configured to pivot the head portion relative to the body portion up to about 180 degrees.

25. The torch of claim 22 wherein the rotational joint is configured to rotate the head portion and the pivotal joint relative to at least a portion of the body portion up to about 360 degrees.

26. The torch of claim 22 wherein the pivotal joint comprises an pivotal connector, the pivotal connector simultaneously pivoting about a common axis with the pivotal joint of the torch.

27. A method for creating a bevel cut, the method comprising:
providing the thermal processing torch of claim 1;
pivoting a head portion of the thermal processing torch relative to a torch body of the thermal processing torch, the torch body rigidly affixed to a gantry; and
rotating the pivoted head portion about a longitudinal axis of the torch body to position the torch head relative to a workpiece.

28. An articulating thermal processing torch comprising:
a torch body;
a head portion;
a motorized pivot joint mechanically coupled to at least one of the torch body or head portion to enable the head portion to pivot relative to the body and to provide fluid communication and electrical communication between the head portion and the torch body, the fluid communication being provided by a fluid passage to provide a processing gas to the head portion, the fluid passage being defined and surrounded by an electrically conductive wall that provides the electrical communication; and
a motorized rotational joint mechanically coupled to at least one of the torch body or head portion to enable the head portion to rotate relative to at least a portion of the body for positioning the torch head relative to a workpiece.

29. A beveling torch system comprising:
a torch body having a central longitudinal axis
a torch head connected to the body;
at least one gas lead extending into the torch head;
at least one electrical lead extending into the torch head;
a rotatable connector rotating the torch head independently of the at least one gas lead and the at least one electrical lead about the central longitudinal axis of the torch body; and
a pivotal connector pivoting the torch head about a second axis, the second axis disposed at an angle to the central longitudinal axis of the torch body, the pivotal connector comprising an electrically conductive wall to conduct an electrical current, the electrically conductive wall defining and enclosing a passage to provide a processing gas to the torch head.

30. The system of claim 29 wherein the second axis is substantially perpendicular to the central longitudinal axis of the torch body.

31. The system of claim 29 wherein the torch head is configured to continuously rotate independently of the at least one gas lead and the at least one electrical lead about the central longitudinal axis of the torch body.

32. The system of claim 29, wherein the torch head is mounted on a torch sleeve, the torch sleeve configured to rotate about the central longitudinal axis and pivot the torch head about a second axis substantially perpendicular to the central longitudinal axis.

33. The system of claim 29, wherein at least one electrical motor pivots and rotates the torch head.

* * * * *